United States Patent
Mathew et al.

(10) Patent No.: US 10,798,161 B2
(45) Date of Patent: Oct. 6, 2020

(54) METHOD AND SYSTEM FOR AUTOSCALING APPLICATIONS

(71) Applicant: PayPal, Inc., San Jose, CA (US)

(72) Inventors: Suresh Mathew, San Ramon, CA (US); Shankar Jothi, San Jose, CA (US); Vaibhav Desai, Fremont, CA (US)

(73) Assignee: PayPal, Inc., San Jose, CA (US)

( * ) Notice: Subject to any disclaimer, the term of this patent is extended or adjusted under 35 U.S.C. 154(b) by 49 days.

(21) Appl. No.: 16/001,748

(22) Filed: Jun. 6, 2018

(65) Prior Publication Data

US 2018/0359314 A1  Dec. 13, 2018

Related U.S. Application Data

(60) Provisional application No. 62/516,477, filed on Jun. 7, 2017.

(51) Int. Cl.
*H04L 29/08* (2006.01)
*H04L 12/26* (2006.01)

(52) U.S. Cl.
CPC ...... *H04L 67/1031* (2013.01); *H04L 43/0888* (2013.01); *H04L 43/16* (2013.01); *H04L 43/50* (2013.01); *H04L 43/08* (2013.01)

(58) Field of Classification Search
CPC . H04L 67/1031; H04L 43/0888; H04L 43/16; H04L 41/5038; G06F 11/36
See application file for complete search history.

(56) References Cited

U.S. PATENT DOCUMENTS

| | | | |
|---|---|---|---|
| 8,984,341 B1* | 3/2015 | Chandrasekharapuram | G06F 11/263 714/32 |
| 10,444,744 B1* | 10/2019 | Arguelles | G06F 11/3006 |
| 2009/0158381 A1* | 6/2009 | Sankaranarayanan | H04N 17/004 725/131 |
| 2015/0347286 A1* | 12/2015 | Kruglick | H04L 43/50 714/38.1 |
| 2016/0080242 A1* | 3/2016 | Grosso | H04L 43/50 370/252 |
| 2017/0061322 A1* | 3/2017 | Chari | G06F 21/55 |
| 2018/0295044 A1* | 10/2018 | Johnson | H04L 43/16 |
| 2018/0309639 A1* | 10/2018 | Birkner | H04L 41/14 |

* cited by examiner

*Primary Examiner* — Tonia L Dollinger
*Assistant Examiner* — Jihad K Boustany
(74) *Attorney, Agent, or Firm* — Haynes and Boone, LLP (57) ABSTRACT

Aspects of the present disclosure involve a system and method for autoscaling application pools. The current disclosure presents a system that can be used to understand the throughput of one instance in an application. The throughput at the one instance in the application and/or traffic trend is used to right-size or auto-scale the application pool for the current traffic trend such that the application pool can be adjusted for varying traffic trends.

20 Claims, 7 Drawing Sheets

METHOD AND SYSTEM FOR AUTOSCALING APPLICATIONS

CROSS REFERENCED TO RELATED APPLICATIONS

This application claims the benefit of U.S. Provisional Patent Application Ser. No. 62/516,477, filed on Jun. 7, 2017, the contents of which are incorporated by reference in their entirety.

TECHNICAL FIELD

The present disclosure generally relates to communication systems, and more specifically, to systems for autoscaling applications based on traffic trends.

BACKGROUND

Technological infrastructures have grown tremendously over the past few years hosting multitudes of applications and serving billions of transactions every year. For example, a corporation like PayPal can host more than 3000 internal applications and more than 100 k instances across the infrastructure. Such applications would have to be right-sized in order to ensure optimal resource utilization. However, with widely varying traffic trends that are often present in this type of infrastructure, previous methods to calculate the required computes for a given application remain less accurate, time consuming and often relies on an application development team to define throughput numbers by performing load tests.

Therefore, it would be beneficial if a system were created that decouples the infrastructure and the application development layer in order to create an automated process that can dynamically quantify traffic throughput and autoscale the application pool.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for quantifying traffic throughput. In one embodiment, a system is introduced that can provide an process that can be used to determine traffic trends. In particular, a system is introduced that can be used to understand the throughput of one instance in an application. In another embodiment, the throughput at the one instance in the application and/or traffic trend is used to right-size or auto-scale the application for the current traffic trend such that the application pool can dynamically be adjusted for varying traffic trends.

Conventionally, autoscaling is generally performed in one of two ways, in a reactive way or in a predictive way. Reactive autoscaling involves quickly increasing or decreasing a cluster size that is used for managing traffic, to correspond with changes in a traffic load. This method is effective in reacting to high velocity changes provided the mechanism to provision are available. Additionally, this method may be used to warm-up the newly added instances. However, the most effective way to implement reactive autoscaling is by allowing the user (e.g., application development team) to define the thresholds for instances that can be scaled up or down.

Predictive autoscaling is a method that attempts to model the underlying trend and predicts the changes to better scale the applications. Predictive autoscaling is helpful in cases where the provisioning mechanisms and frameworks need more time to warm up before serving incoming requests. However, this method may not be very useful during surges in incoming requests.

Figure 1A:
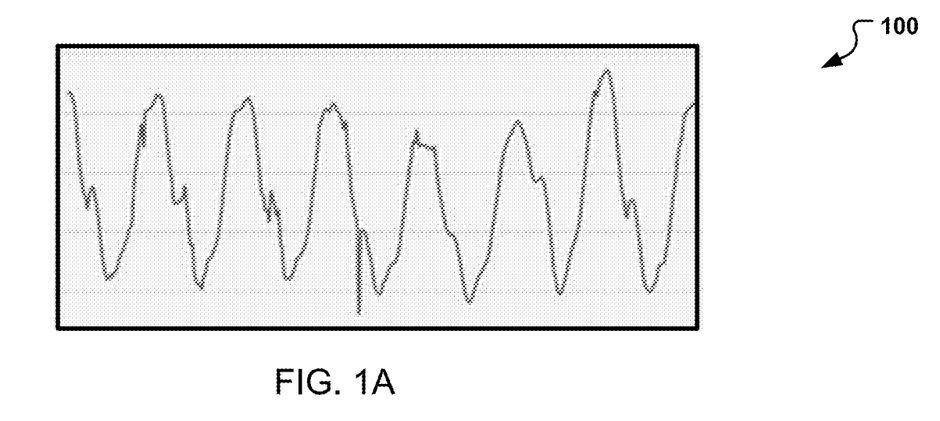
FIGS. 1A-1B illustrates graphs exemplifying traffic patterns for two different applications.
Figure 1B:
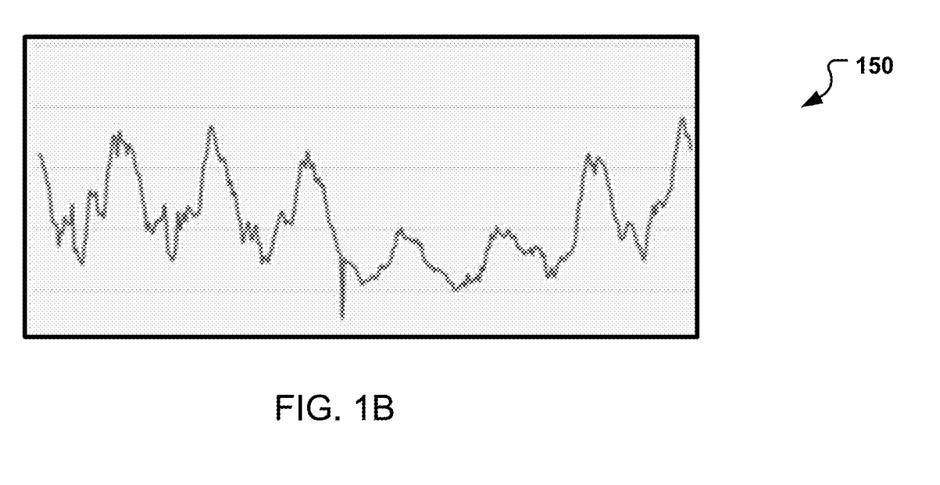

Other autoscaling methods also exist that are a combination of the two approaches, however these come with efficiency numbers that are very context specific and more difficult to implement. For example, consider FIGS. 1A-1B which exemplify incoming traffic patters of two different applications. These two applications have very distinct traffic patterns which can each vary rapidly and independently of each other. FIG. 1A can correspond to a first application with generally steady traffic flow while FIG. 1B can correspond to second application which is less consistent and can very largely over time. Additionally, other traffic patterns can exist such as those with high peaks and valleys, only peaks, only valley, a steady increase or decrease, etc.

Thus, autoscaling using either reactive or predictive autoscaling include drawbacks that make it difficult to autoscale for varying traffic trends such as the traffic patters illustrated above and in conjunction with FIGS. 1A-1B which. Therefore, a system and method for understand the throughput of one instance in an application and autoscaling the number of computing instances for the current traffic trend would be beneficial.

Figure 2:
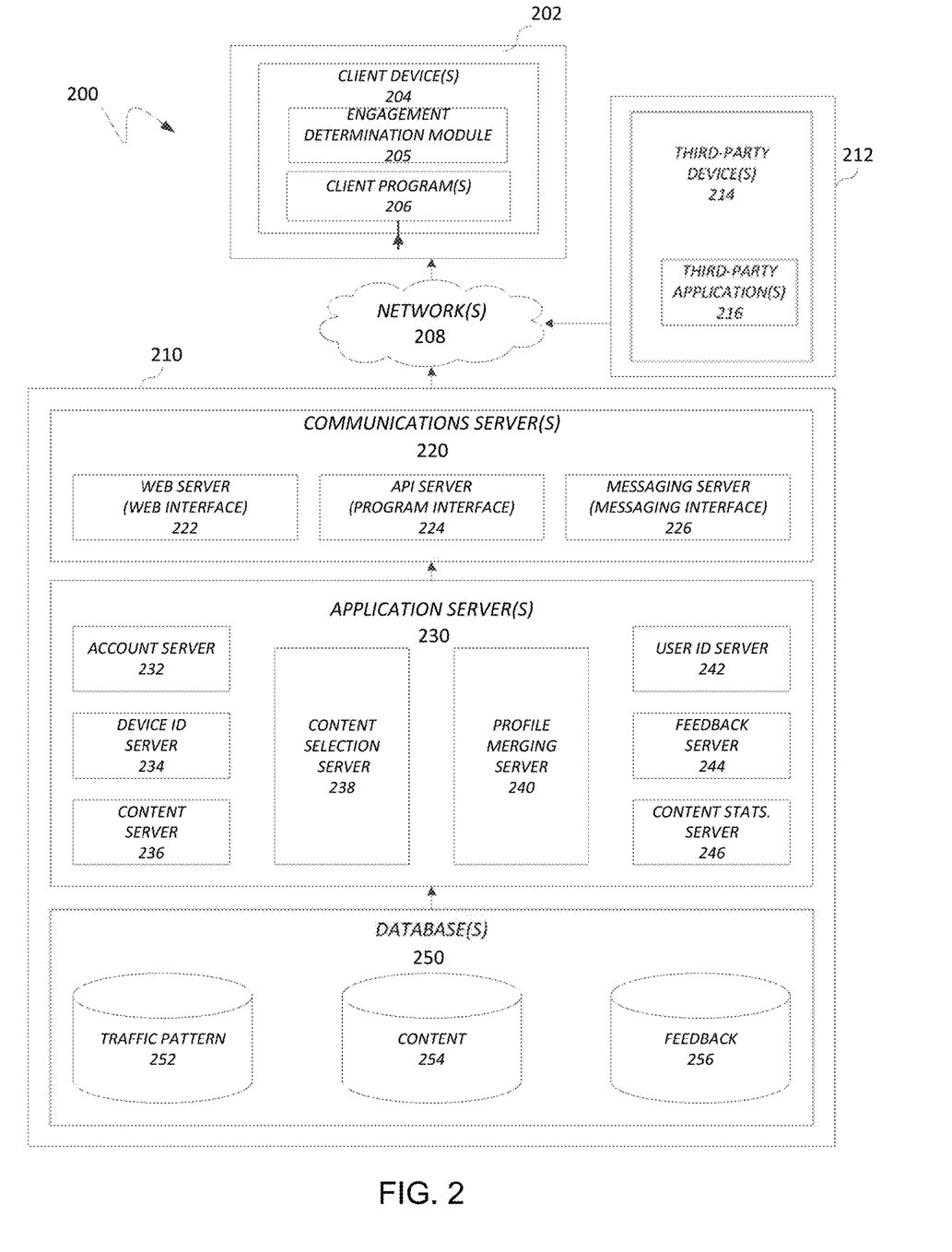
FIG. 2 illustrates a block diagram of a system for autoscaling application pools.

FIG. 2 provides an exemplary system that can be used for autoscaling application pools. In one embodiment, the system 200 illustrates numerous communication servers 220 and application servers 230 that can be used in conjunction with databases 250, client device 202 and other third party devices 212 during the use of an application. In addition, the system can include numerous other servers working coherently and part of a cluster (not shown) and/or software components that operate to perform various methodologies in accordance with the described embodiments. Severs may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 2 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing environment 200 may include, among various devices, servers, databases and other elements, one or more clients 202 that may comprise or employ one or more client devices 204, such as a laptop, a mobile computing device, a tablet, a PC, a wearable device, desktop and/or any other computing device having computing and/or communications capabilities in accordance with the described embodiments. Client devices 204 may include a cellular telephone, smart phone, electronic wearable device (e.g., smart watch, virtual reality headset), or other similar mobile devices that a user may carry on or about his or her person and access readily. Alternatively, client device 204 can include one or more machines processing, authorizing, and performing transactions that may be monitored.

Client devices 204 generally may provide one or more client programs 206, such as system programs and application programs to perform various computing and/or communications operations. Some example system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Some example application programs may include, without limitation, a web browser application, messaging applications (e.g., e-mail, IM, SMS, MMS, telephone, voicemail, VoIP, video messaging, internet relay chat (IRC)), contacts application, calendar application, electronic document application, database application, media application (e.g., music, video, television), location-based services (LBS) applications (e.g., GPS, mapping, directions, positioning systems, geolocation, point-of-interest, locator) that may utilize hardware components such as an antenna, and so forth. One or more of client programs 206 may display various graphical user interfaces (GUIs) to present information to and/or receive information from one or more users of client devices 204. In some embodiments, client programs 206 may include one or more applications configured to conduct some or all of the functionalities and/or processes discussed below.

As shown, client devices 204 may be communicatively coupled via one or more networks 208 to a network-based system 210. Network-based system 210 may be structured, arranged, and/or configured to allow client 202 to establish one or more communications sessions between network-based system 210 and various computing devices 204 and/or client programs 206. Accordingly, a communications session between client devices 204 and network-based system 210 may involve the unidirectional and/or bidirectional exchange of information and may occur over one or more types of networks 208 depending on the mode of communication. While the embodiment of FIG. 2 illustrates a computing environment 200 deployed in a client-server operating relationship, it is to be understood that other suitable operating environments, relationships, and/or architectures may be used in accordance with the described embodiments.

Data communications between client devices 204 and the network-based system 210 may be sent and received over one or more networks 208 such as the Internet, a WAN, a WWAN, a WLAN, a mobile telephone network, a landline telephone network, personal area network, as well as other suitable networks. For example, client devices 204 may communicate with network-based system 210 over the Internet or other suitable WAN by sending and or receiving information via interaction with a web site, e-mail, IM session, and/or video messaging session. Any of a wide variety of suitable communication types between client devices 204 and system 210 may take place, as will be readily appreciated. In particular, wireless communications of any suitable form may take place between client device 204 and system 210, such as that which often occurs in the case of mobile phones or other personal and/or mobile devices.

In various embodiments, computing environment 200 may include, among other elements, a third party 212, which may comprise or employ third-party devices 214 hosting third-party applications 216. In various implementations, third-party devices 214 and/or third-party applications 216 may host applications associated with or employed by a third party 512. For example, third-party devices 214 and/or third-party applications 216 may enable network-based system 210 to provide client 202 and/or system 210 with additional services and/or information, such as merchant information, data communications, payment services, security functions, customer support, and/or other services, some of which will be discussed in greater detail below. Third-party devices 214 and/or third-party applications 216 may also provide system 210 and/or client 202 with other information and/or services, such as email services and/or information, property transfer and/or handling, purchase services and/or information, and/or other online services and/or information and other processes and/or services that may be processes and monitored by system 210.

In one embodiment, third-party devices 214 may include one or more servers, such as a transaction server that manages and archives transactions. In some embodiments, the third-party devices may include a purchase database that can provide information regarding purchases of different items and/or products. In yet another embodiment, third-party severs 214 may include one or more servers for aggregating consumer data, purchase data, and other statistics.

Network-based system 210 may comprise one or more communications servers 220 to provide suitable interfaces that enable communication using various modes of communication and/or via one or more networks 208. Communications servers 220 may include a web server 222, an API server 224, and/or a messaging server 226 to provide interfaces to one or more application servers 230. Application servers 230 of network-based system 210 may be structured, arranged, and/or configured to provide various online services, merchant identification services, merchant information services, purchasing services, monetary transfers, checkout processing, data gathering, data analysis, and other services to users that access network-based system 210. In various embodiments, client devices 204 and/or third-party devices 214 may communicate with application servers 230 of network-based system 210 via one or more of a web interface provided by web server 222, a programmatic interface provided by API server 224, and/or a messaging interface provided by messaging server 226. It may be appreciated that web server 222, API server 224, and messaging server 226 may be structured, arranged, and/or configured to communicate with various types of client devices 204, third-party devices 214, third-party applications 216, and/or client programs 206 and may interoperate with each other in some implementations.

Web server 222 may be arranged to communicate with web clients and/or applications such as a web browser, web browser toolbar, desktop widget, mobile widget, web-based application, web-based interpreter, virtual machine, mobile applications, and so forth. API server 224 may be arranged to communicate with various client programs 206 and/or a third-party application 216 comprising an implementation of API for network-based system 210. Messaging server 226 may be arranged to communicate with various messaging clients and/or applications such as e-mail, IM, SMS, MMS, telephone, VoIP, video messaging, IRC, and so forth, and messaging server 226 may provide a messaging interface to enable access by client 202 and/or third party 212 to the various services and functions provided by application servers 230.

Application servers 230 of network-based system 210 may be a server that provides various services to clients including, but not limited to, data analysis, geofence management, order processing, checkout processing, and/or the like. Application server 230 of network-based system 210 may provide services to a third party merchants such as real time consumer metric visualizations, real time purchase information, and/or the like. Application servers 230 may include an account server 232, device identification server 234, payment server 236, queue analysis server 238, purchase analysis server 240, geofence server 252, notification server 254, and/or checkout server 246. These servers, which may be in addition to other servers, may be structured and arranged to configure the system for monitoring queues and identifying ways for reducing queue times.

Application servers 230, in turn, may be coupled to and capable of accessing one or more databases 250 including a traffic pattern database 252, an account database 254, transaction database 256, and/or the like. Databases 250 generally may store and maintain various types of information for use by application servers 230 and may comprise or be implemented by various types of computer storage devices (e.g., servers, memory) and/or database structures (e.g., relational, object-oriented, hierarchical, dimensional, network) in accordance with the described embodiments.

As indicated, traffic trends vary tremendously and identifying system 200 capable of autoscaling for the traffic trends is beneficial as remediation time and costs can both be decreased. An effectively way to auto-scale the application pool, is to use a system 200 that can quantify a unit computer's throughput in an application in a dynamic way for the current traffic trend and then take the information acquired to dynamically determine an autoscaling plan.

Note that constraints can exist in determining the correct method to employ for autoscaling outside the predictive and reactive method. For example, a traffic pattern trend, complex topology, developer isolation and frequency of right sizing can be constraints in determining the correct method to employ. Complex topology plays a significant role as a huge number of applications with a wide variety of characteristics and dependencies are hosted by a single infrastructure. Next, even though the assumption to correlate overall incoming traffic to scale every application in the structure seems straightforward the solution is not so in determining an optimized solution to effectively right size every application cluster.

Also, developer isolation becomes a constraint as relying on application development team to establish throughput numbers proves to be ineffective. Because the assumption to right size the environment is to calculate the throughput of an instance for the current traffic trend and code version continuously. To do this, the one or more users may need to define more processes to simulate production environments that voids the purpose of isolating them from the infrastructure related details. This is not a feasible solution.

In addition, the frequency needed for right sizing is also a constraint to consider. One method could include an attempt to autosscale by considering incoming traffic trend over a defined period. To illustrate, assume that it is desired to have a pool to be right sized for the next week with a decreasing traffic trend. However, varying patterns in each day can be observed with peaks occurring at specified periods within a day. This could be scaled up and down for a given day or scale once to address the maximum traffic for the upcoming week itself. However, there will be few resources under-utilized this way. Further, the underlying provisioning and decommissioning mechanisms to determine the frequency of right sizing would need to be taken into consideration. Hence, an effective way of establishing the right sizing plan after the throughput is established for the input traffic pattern is desirable.

Figure 3:
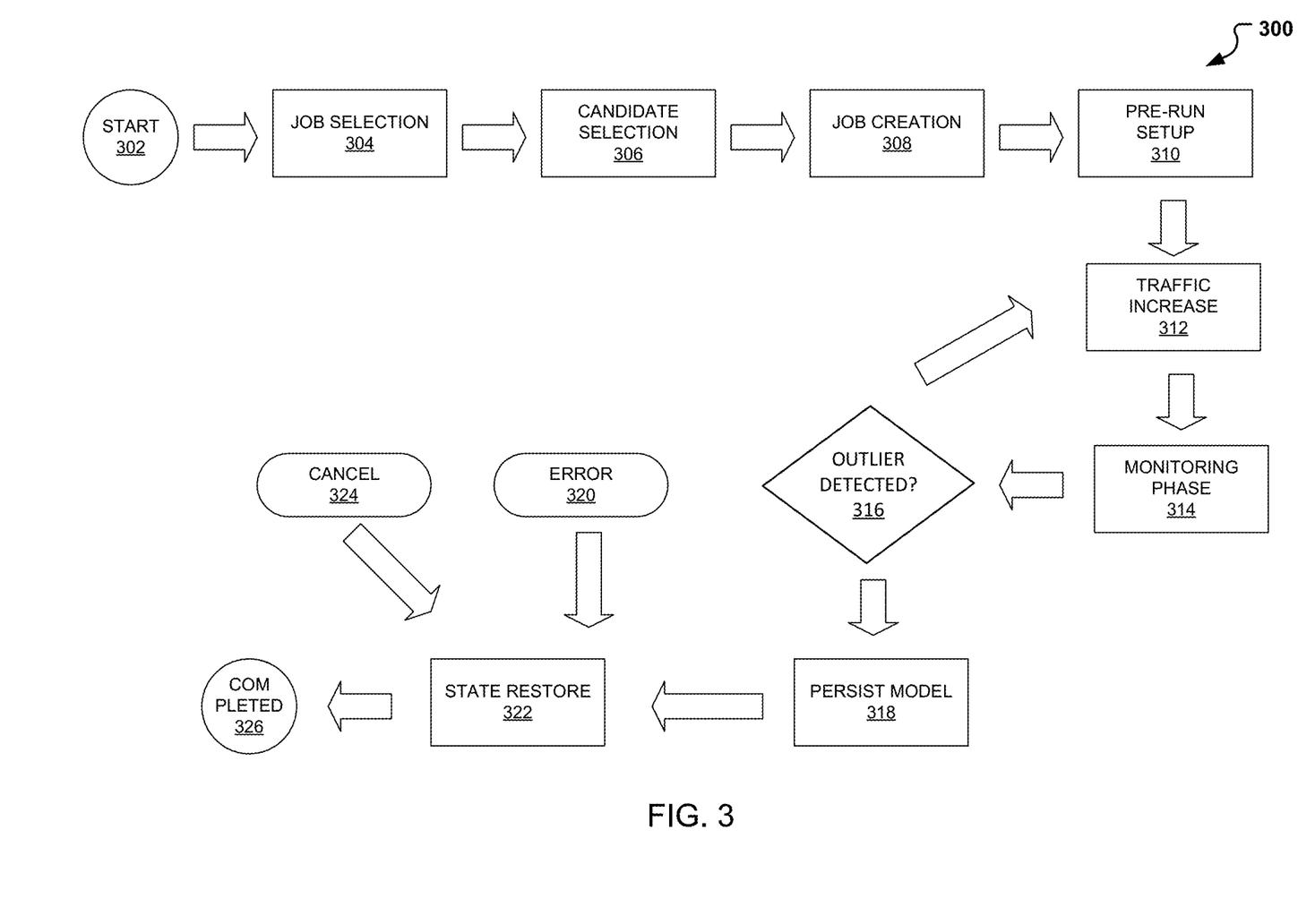
FIG. 3 illustrates a workflow diagram illustrating steps for autoscaling application pools.

In one embodiment, a system and method is introduced for more effectively determining traffic trends and autoscaling. FIG. 3 illustrates a flow diagram illustrating steps in the process for autoscaling application pools. In particular, FIG. 3 is introduced with alternate method that can be used to identify right-sizing. In particular, identifying the traffic trend will be determined using a four step process that can include: defining a reference cluster and choosing a candidate instance, setting up the pre-test, increasing the load and monitoring, and applying restoration.

For example, workflow 300 can generally include a method for selecting one instance from the cluster running in production serving live traffic behind a load balancer. Once the instance is selected, gradually increasing an amount of traffic to be diverted to the chosen instance relative to the other instances. Then, the process continues with various metrics being monitored for the selected instance to observe the state at which it becomes an outlier in comparison to the other instances. Finally, the state can be used to define the maximum threshold beyond which there would be a negative impact to the end user experience. In addition, the maximum throughput can be determined based on the amount of traffic diverted to this instance right before the maximum threshold is obtained.

Turning to FIG. 3, the traffic trend and throughput determination can begin with a first step in which a reference cluster is defined and a candidate instance is chosen. In one embodiment, the definition of the reference cluster and selection of a candidate instance workflow can begin at a queuing model where a particular job may be selected 304. In an implementation, a determination may be made as to how many processes are running at a given moment. In order to avoid overloading the balancer, particular instances in time may be selected in which this determination is made. Therefore, during this process, all processes pending may be populated into the queue and a job may be selected at that time. Next, a candidate selection may be made. To determine which candidate to select, machines available are identified and any noisy, outlier, or unavailable machines are removed as an option. Then with the remaining machines, a reference cluster may be selected and a candidate instance is selected 306, a job is created 308 and then traffic may be increased.

In particular, this step can occur during one of the throughput test runs as it runs as one of agents. The agent can start with picking up one of applications running behind a datacenter's load balancer. In one embodiment, the state of an application can be defined using various metrics, for example, cpu, memory, latency and error count can be used. The workflow can then begin by identifying the outlier instances in terms of any of the metrics selected using a density-based spatial clustering of applications with noise (DBSCAN) algorithm. The DBSCAN algorithm can generally include grouping points in a space that are closely packed or near neighbors and marking outliers. Note that alternatively, other machine learning and data mining algorithms may be used including but not limited to dimentionality reduction, structured prediction, neutral networks, support vector machines, etc.

Figure 4A:
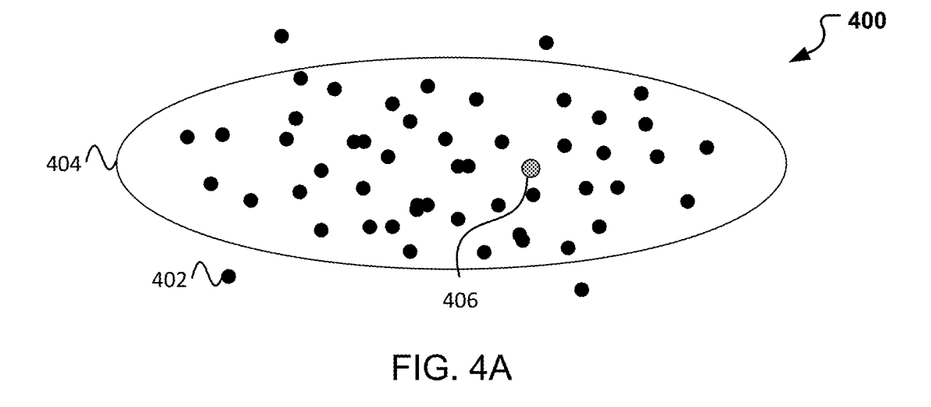
FIGS. 4A-4C illustrates graphs illustrating increase traffic and latency on a selected instance.

After removing outliers, the remaining instances can be used to form a reference cluster. To ensure that all the machines remain in the same cluster throughout a test run, a candidate instance is chosen from this cluster. FIG. 4A illustrates an exemplary run 400 illustrating outliers 402, the reference cluster 404, and the candidate instance selected 406.

Once the candidate instance is selected, workflow 300 continues to the pre-test setup 310. At the pre-test setup, a load balancer can run on top of the instances and route traffic in a round robin fashion. Although the load balancing can occur in various ways, a ratio-member method is used in order to increase traffic to the candidate instance in steps or in varying increments. Further, in some embodiments certain safety checks can be put in place to ensure a smooth testing. For example, the entire pool can be locked from external modifications to avoid mutations while running the tests. As another example, quick stop and restore options can be added and available for handling live traffic. This quick store and restore option can help ensure that the system is ready for a hard stop and restore during any point of the workflow 300 should there be any problem.

Next, after the pre-test setup 310 is complete in workflow 300, the next step includes increasing the load 312 and monitoring 314 for changes. To do so, a step increase in traffic load is applied. After every step increase in weight of traffic load being diverted to the candidate instance, the metrics previously defined are monitored continuously for any change in pattern with a hard check on latency. In some infrastructures, (e.g., PayPal infrastructure), acceptable threshold metrics can be defined. For example, CPU and memory metrics can have defined thresholds that can be compared to ensure the values are realistic using an algorithm like DBSCAN. While the increase in traffic is applied, the candidate instance can be monitored for a specific period and a post can be defined that flags an increase in traffic or any deviations in the above mentioned metrics. To ensure the data can later be retrieved and/or reviewed, the state of the candidate instance can be stored at every increase during the entire monitoring session.

If there are no deviations identified or outliers detected 316, it can be determine that the increase in traffic 312 can be handled by the candidate instance and further increases in traffic can be applied. If there is a significant change in latency or deviations and/or an outlier is detected 316 beyond set thresholds for the other metrics then it could be determined that the current state is at the end of the test at the persist model 318. Note that in some instances, a threshold on the load balancer weight can be used to define a finite horizon over the step increases of load on the candidate instance.

Once the traffic load has been increased and monitored, process 300 continues to the restoration step 322. At the restoration step, the results of the traffic increase are monitored are analyzed to determine how the candidate instance responded and how the configuration changes are to be restored. For example, the result of our throughput test could be one of two: 1) the chosen candidate fails to handle the increase in traffic or 2) the chosen candidate exhausts the number of weight increases on the load balancer. If the verdict is that the candidate instance fails to handle the load after a weight increase, the state before which the failure occurred is used to observe the throughput. In the second case, the last state at which the weight updates get exhausted determines the throughput. All the configuration changes are restored on the load balancer and the post-run monitoring phase are entered to ensure that the candidate instance reverts to its original state. Alternatively, if an error 320 or cancellation 324 is encountered, then workflow 300 can also return to the restoration state 322.

Figure 4B:
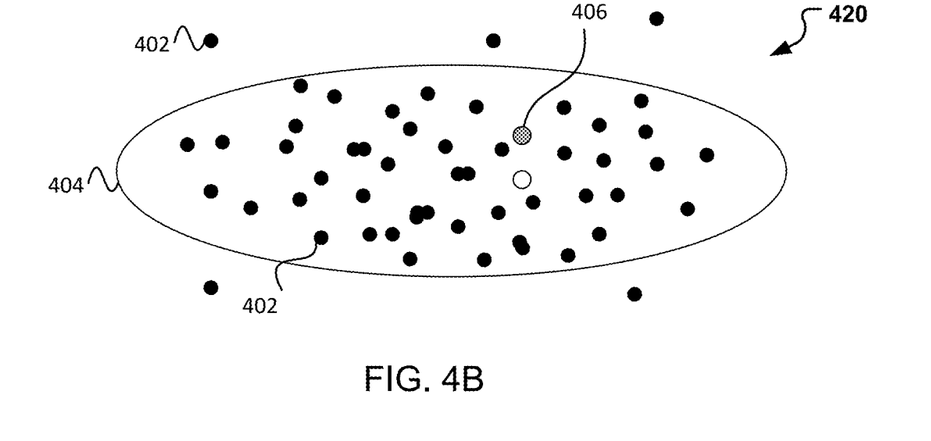
Figure 4C:
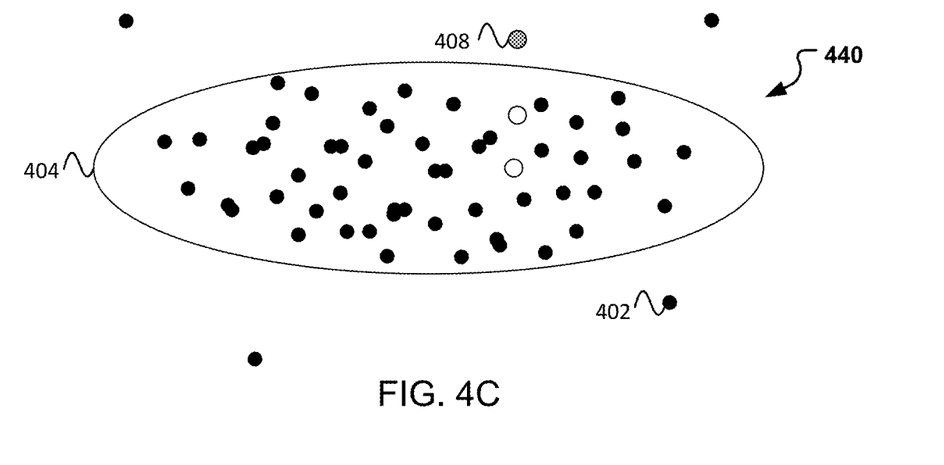

FIGS. 4B and 4C provide illustrative snapshots of host latencies. In particular, FIG. 4B illustrates an exemplary run 420 showing how the candidate host 406 remains in the cluster after a weight 2× latency is applied. In contrast, FIG. 4C illustrates an exemplary run 440 showing how the candidate 408 failed to remain in the reference cluster 404 after a weight 3× latency is applied. Therefore, FIG. 4B illustrates traffic that can be handled by the candidate instance, while FIG. 4C illustrates that the deviations are beyond the candidate instance's threshold.

Once the traffic trends are determined, the right-sizing or autoscaling of applications can occur. In one embodiment, capacity is used to determine auto-scaling. Capacity of an application cluster can be determined using:

$$\text{Required machines per zone} = \frac{\text{Peak application throughput}}{\text{Unit compute throughput}} * AF$$

$$\text{Availability factor, } AF = \frac{\text{Max availability zones}}{\text{Guaranteed availability zones}}$$

As an example, if peak throughput for an application is 1200, and unit compute throughput is 100 and the availability factor (AF) is known to be 1.5, then the capacity of the application cluster or number of machines required is (1200/100)*1.5=18. Therefore, the number of machines needed for a given traffic flow in this instance can be determined to be 18. Thus, autoscaling can be used to adjust to right-size for the traffic with 18 machines.

Note that in some instances, during workflow 300, enough traffic is received such that at any given period an instance is saturated such that the instance is pushed out as an outlier in comparison to other instances in the pool. In addition, auto-scaling can be determined dynamically in order to accommodate for varying traffic trends.

Figure 5:
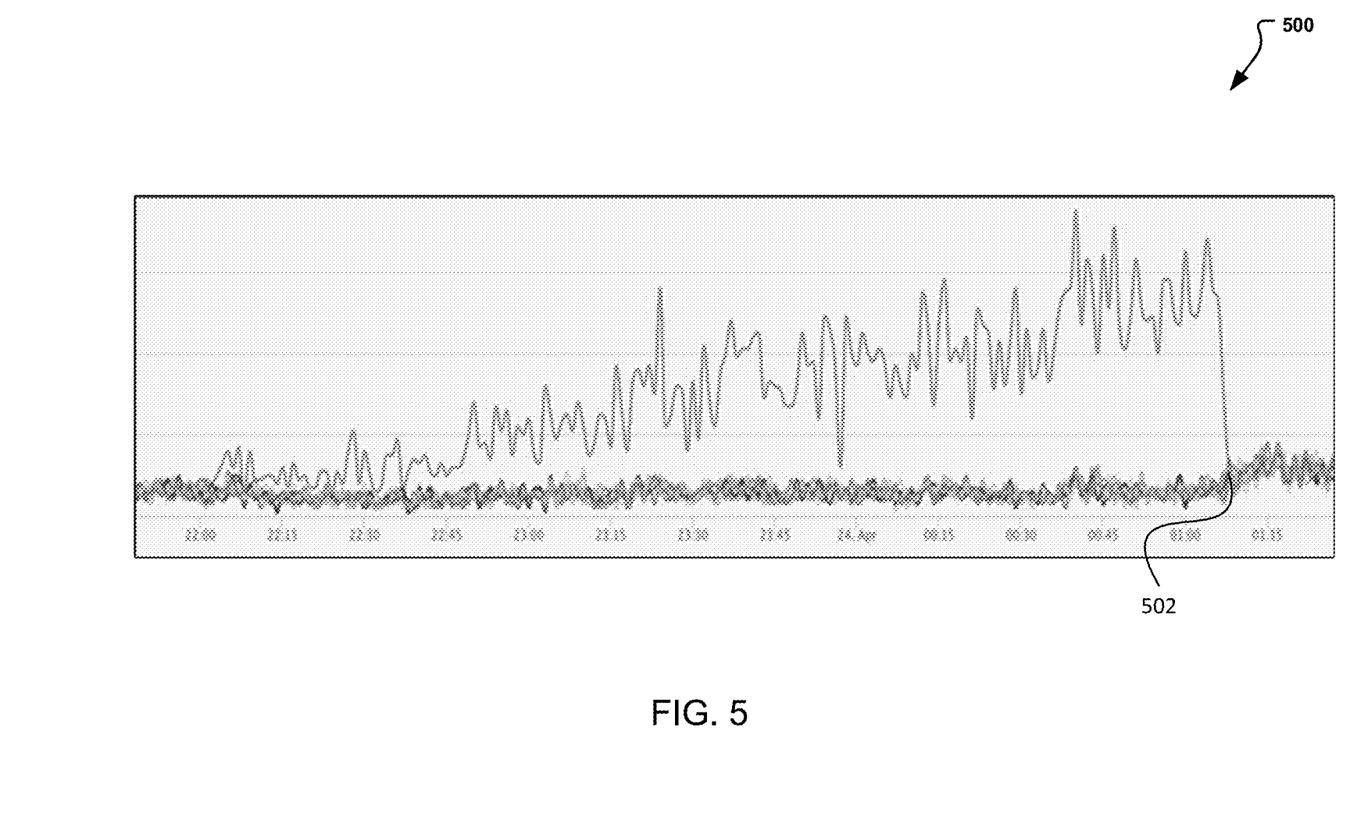
FIG. 5 illustrates a sample run in production using an autoscaling technique.

To illustrate a sample production of a candidate host, FIG. 5 is presented. As illustrated, FIG. 5 provides the change in transaction numbers of the candidate instance 502 during an exercise window. That is to say, FIG. 5 illustrates in red, the selected candidate 502 designed to increase as traffic increases and then returns to normal capacity to match those of other instances (illustrated by the various colors). In addition, the point at which the change in latency occurs is also illustrated. For example, in FIG. 5, the change in latency occurs when monitoring is ended and restoration is entered.

Figure 6:
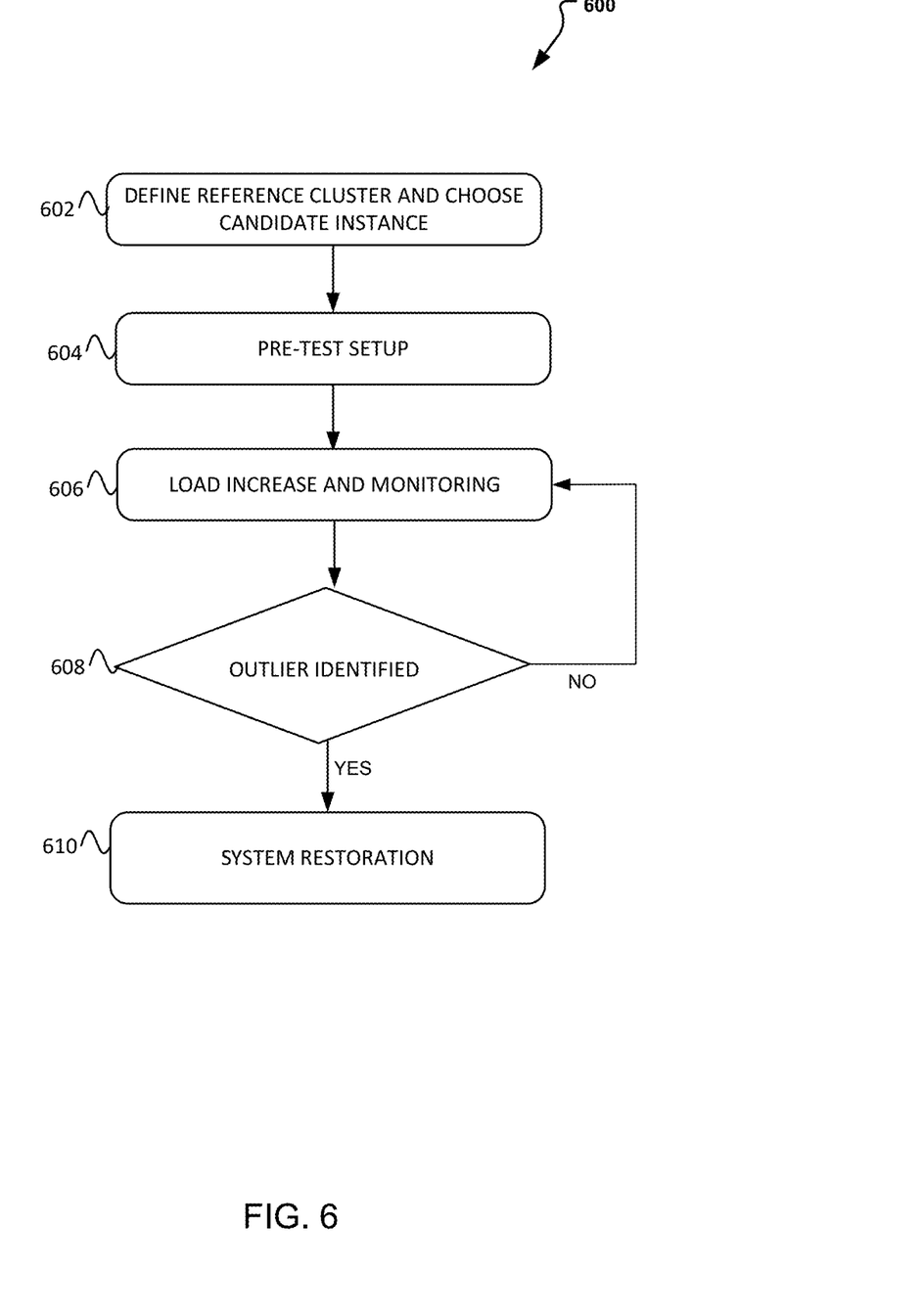
FIG. 6 illustrates a flow diagram illustrating operations for autoscaling application pools.

To illustrate how autoscaling for applications is performed, FIG. 6 is introduced which illustrates example process 600 that may be implemented on a system, such as system 200 in FIG. 2. In particular, FIG. 6 illustrates a flow diagram illustrating how to autoscale based on traffic trends. According to some embodiments, process 600 may include one or more of operations 602-610, which may be implemented, at least in part, in the form of executable code stored on a non-transitory, tangible, machine readable media that, when run on one or more hardware processors, may cause a system to perform one or more of the operations 602-610.

Process 600 may begin with operation 602, where a reference cluster is defined and candidate instance is chosen. As previously indicated, in order to obtain the reference cluster and identify a candidate instance, an agent can start with picking up one of applications running behind a datacenter's load balancer. In one embodiment, the state of an application can be defined using various metrics, for example, cpu, memory, latency and error count can be used and outlier instances can be identified. The outliers may be removed and the remaining instances can be used to form a reference cluster. To ensure that all the machines remain in the same cluster throughout a test run, a candidate instance is chosen from this cluster and used to determine capacity.

At operation 604, once the candidate instance has been chosen, pre-test setup may begin. At the pre-test setup operation checks can be put in place to ensure a smooth testing. For example, the entire pool can be locked from external modifications to avoid mutations while running the tests. As another example, quick stop and restore options can be added and available for handling live traffic.

Upon completion of operation 604, process 600 continues to operation 606 wherein the load is increased on the chosen candidate and performance monitored. At this operation, as previously indicated, an increase in weight of traffic load being diverted to the candidate instance occurs and metrics are monitored continuously for any change in pattern with a hard check on latency. During this process, a round-robin approach is taken where the traffic is increased, and performanced is monitored with checks for outliers after each increase at operation 608. If no outliers, latency, or deviations are experienced, then process 600 continues back at operation 606 where traffic is again increased and performance monitored. Alternatively, if at operation 608, outliners are identified, then process 600 instead continues to operation 610 where auto-scaling is completed and system restoration begins. At system restoration, all the configuration changes are restored on the load balancer and the post-run monitoring phase are entered to ensure that the candidate instance reverts to its original state.

Note that the four step process defined is used for exemplary purposes and is not so limited. For example, the process can take more or less steps and the steps can occur simultaneously or in a different order than those described.

Figure 7:
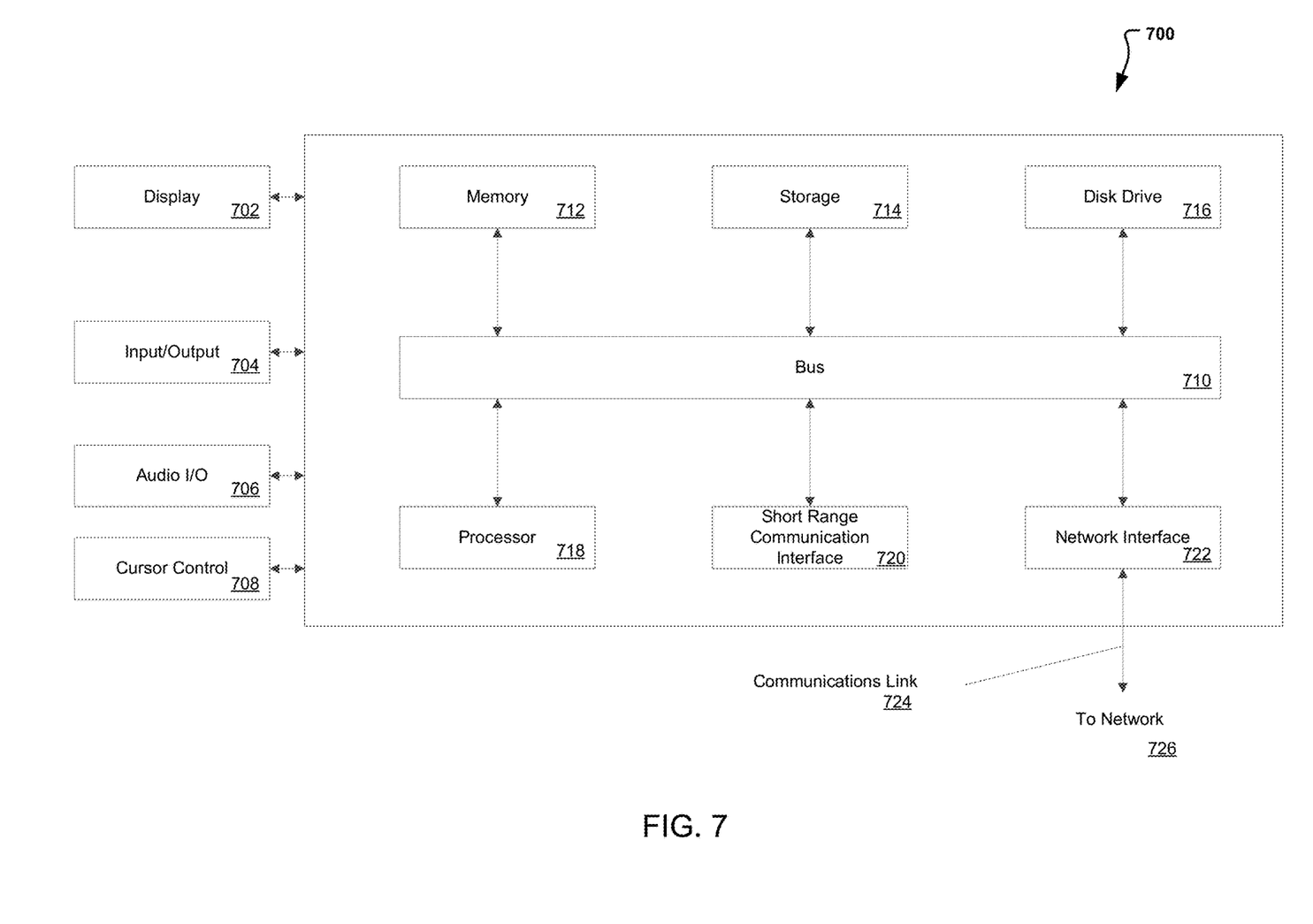
FIG. 7 illustrates an example block diagram of a computer system suitable for implementing one or more devices of the communication systems of FIGS. 2 and 3.

FIG. 7 illustrates an example block diagram of a computer system suitable implementing one or more devices of the communication systems of FIGS. 2-5 for determining application traffic trends. Thus, computer system 700 can be used in process 700 for determining traffic trends. In various implementations, a device that includes computer system 700 may comprise a personal computing device (e.g., a smart or mobile device, a computing tablet, a personal computer, laptop, wearable device, PDA, etc.) that is capable of communicating with a network 726 (e.g., network 208) and determining a autoscaling for applications based on traffic trends. A service provider and/or a content provider may utilize a network computing device (e.g., a network server) capable of communicating with the network. It should be appreciated that each of the devices utilized by users, service providers, and content providers may be implemented as computer system 700 in a manner as follows.

Additionally, as more and more devices become communication capable, such as new smart devices using wireless communication to report, track, message, relay information and so forth, these devices may be part of computer system 700. For example, augmented systems, servers, and other processing devices may be incorporated with the systems discussed herein.

Computer system 700 may include a bus 710 or other communication mechanisms for communicating information data, signals, and information between various components of computer system 700. Components include an input/output (I/O) component 704 that processes a user action, such as selecting keys from a keypad/keyboard, selecting one or more buttons, links, actuatable elements, etc., and sending a corresponding signal to bus 710. I/O component 704 may also include an output component, such as a display 702 and a cursor control 708 (such as a keyboard, keypad, mouse, touchscreen, etc.). In some examples, I/O component 704 other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 718, which may be a micro-controller, digital signal processor (DSP), or other processing component, that processes these various signals, such as for display on computer system 700 or transmission to other devices over a network 726 via a communication link 724. Again, communication link 724 may be a wireless communication in some embodiments. Processor 718 may also control transmission of information, such as cookies, IP addresses, images, and/or the like to other devices.

Components of computer system 700 also include a system memory component 714 (e.g., RAM), a static storage component 714 (e.g., ROM), and/or a disk drive 716. Computer system 700 performs specific operations by processor 718 and other components by executing one or more sequences of instructions contained in system memory component 712 (e.g., for engagement level determination). Logic may be encoded in a computer readable medium, which may refer to any medium that participates in providing instructions to processor 718 for execution. Such a medium may take many forms, including but not limited to, non-volatile media, volatile media, and/or transmission media. In various implementations, non-volatile media includes optical or magnetic disks, volatile media includes dynamic memory such as system memory component 712, and transmission media includes coaxial cables, copper wire, and fiber optics, including wires that comprise bus 710. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 700 may also include a short range communications interface 720. Short range communications interface 720, in various embodiments, may include transceiver circuitry, an antenna, and/or waveguide. Short range communications interface 720 may use one or more short-range wireless communication technologies, protocols, and/or standards (e.g., WiFi, Bluetooth®, Bluetooth Low Energy (BLE), infrared, NFC, etc.).

Short range communications interface 720, in various embodiments, may be configured to detect other devices with short range communications technology near computer system 700. Short range communications interface 720 may create a communication area for detecting other devices with short range communication capabilities. When other devices with short range communications capabilities are placed in the communication area of short range communications interface 720, short range communications interface 720 may detect the other devices and exchange data with the other devices. Short range communications interface 720 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 720 may identify a local area network using a short range communications protocol, such as WiFi, and join the local area network. In some examples, computer system 700 may discover and/or communicate with other devices that are a part of the local area network using short range communications interface 720. In some embodiments, short range communications interface 720 may further exchange data and information with the other devices that are communicatively coupled with short range communications interface 720.

In various embodiments of the present disclosure, execution of instruction sequences to practice the present disclosure may be performed by computer system 700. In various other embodiments of the present disclosure, a plurality of computer systems 700 coupled by communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 724 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on the user and user device, however, a customer, a merchant, a service or payment provider may otherwise presented with tailored information. Thus, "user" as used herein can also include charities, individuals, and any other entity or person receiving information. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising
a non-transitory memory storing instructions; and
a processor configured to execute the instructions to cause the system to:
determine a reference cluster of instances of an application in an application pool;
select a candidate instance from the reference cluster of instances;
increase live traffic routed to the candidate instance for a first period of time using a load balancer having a threshold defining a finite horizon of a number of step increases in the live traffic routed to the candidate instance;
monitor the candidate instance to determine whether the increasing the live traffic routed to the candidate instance for the first period of time results in an outlier metric of the application;
determine that the increase in live traffic routed to the candidate instance for the first period of time did not result in the outlier metric of the application;
in response to the determining that the increase in live traffic routed to the candidate instance for the first period of time fails to result in the outlier metric of the application, increase the live traffic routed to the candidate instance, using the load balancer, for a second period of time, wherein the live traffic routed to the candidate instance for the second period of time is greater than the live traffic routed to the candidate instance for the first period of time;
monitor the candidate instance to determine whether the increasing the live traffic routed to the candidate instance for the second period of time results in the outlier metric of the application;

determine that the increase in the live traffic routed to the candidate instance for the second period of time fails to result in the outlier metric and the number of step increases in the live traffic routed to the candidate instance using the load balancer has been exhausted; and subsequent to the determination that the increase in live traffic routed to the candidate instance for the second period of time fails to result in the outlier metric and the number of step increases in live traffic routed to the candidate instance using the load balancer has been exhausted, restore a status of the candidate instance to a status that existed before the increasing the live traffic routed to the candidate instance for the first period of time.

2. The system of claim 1,
wherein the determining the reference cluster of instances comprises:
removing instance outliers in the application; and
selecting a plurality of instances remaining after the instance outliers in the application are removed.

3. The system of claim 2, wherein executing the instructions further causes the system to:
identify the candidate instance from the reference cluster of instances.

4. The system of claim 2, wherein executing the instructions further causes the system to determine the instance outliers using at least a density-based spatial clustering algorithm.

5. The system of claim 1, wherein the increasing the live traffic routed to the candidate instance for the first period of time and for the second period of time is performed in incremental steps.

6. The system of claim 1, wherein the increasing the live traffic for the first period of time and for the second period of time includes increasing a weight of a traffic load of the live traffic being diverted to the candidate instance.

7. The system of claim 1, wherein executing the instructions further causes the system to record a traffic capacity corresponding to the determination of the outlier metric.

8. A method comprising:
determining a reference cluster of instances of an application in an application pool;
selecting a candidate instance from the reference cluster of instances;
increasing live traffic routed to the candidate instance for a first period of time using a load balancer having a threshold defining a finite horizon of a number of step increases in the live traffic routed to the candidate instance;
monitoring the candidate instance to determine whether the increasing the live traffic routed to the candidate instance for the first period of time results in an outlier metric of the application;
determining that the increasing the live traffic routed to the candidate instance for the first period of time did not result in the outlier metric of the application;
in response to the determining that the increasing the live traffic routed to the candidate instance for the first period of time fails to result in the outlier metric of the application, increasing the live traffic routed to the candidate instance, using the load balancer, for a second period of time, wherein the live traffic routed to the candidate instance for the second period of time is greater than the live traffic routed to the candidate instance for the first period of time;
monitoring the candidate instance to determine whether the increasing the live traffic routed to the candidate instance for the second period of time results in the outlier metric of the application;
determining that the increasing the live traffic routed to the candidate instance for the second period of time fails to result in the outlier metric and the number of step increases in the live traffic routed to the candidate instance using the load balancer has been exhausted; and
restoring a capacity of the candidate instance to a capacity that existed before the increasing the live traffic routed to the candidate instance for the first period of time.

9. The method of claim 8, wherein the determining the reference cluster of instances of the application in the application pool comprises:
removing instance outliers in the application; and
selecting a plurality of instances remaining after the instance outliers in the application are removed.

10. The method of claim 9, further comprising:
identifying the candidate instance from the reference cluster of instances.

11. The method of claim 9, further comprising determining the instance outliers using at least a density-based spatial clustering algorithm.

12. The method of claim 8, wherein the increasing the live traffic routed to the candidate instance for the first period of time and the second period of time is performed in incremental steps.

13. The method of claim 8, wherein the increasing the live traffic routed to the candidate instance for the first period of time and the second period of time includes increasing a weight of a traffic load of the live traffic being diverted to the candidate instance.

14. A non-transitory machine-readable medium having stored thereon machine-readable instructions executable to cause a machine to perform operations comprising:
determining a reference cluster of instances of an application in an application pool;
selecting a candidate instance from the reference cluster of instances;
increasing live traffic routed to the candidate instance for a first period of time using a load balancer having a threshold defining a finite horizon of a number of step increases in the live traffic routed to the candidate instance;
monitoring the candidate instance to determine whether the increasing the live traffic routed to the candidate instance for the first period of time results in an outlier metric of the application;
determining that the increasing the live traffic routed to the candidate instance for the first period of time did not result in the outlier metric of the application;
in response to the determining that the increasing the live traffic routed to the candidate instance for the first period of time fails to result in the outlier metric of the application, increasing the live traffic routed to the candidate instance, using the load balancer, for a second period of time, wherein the live traffic routed to the candidate instance for the second period of time is greater than the live traffic routed to the candidate instance for the first period of time;
monitoring the candidate instance to determine whether the increasing the live traffic routed to the candidate instance for the second period of time results in the outlier metric of the application;

determining that the increasing the live traffic routed to the candidate instance for the second period of time fails to result in the outlier metric and the number of step increases in the live traffic routed to the candidate instance using the load balancer has been exhausted; and restoring a traffic capacity of the candidate instance to a traffic capacity that existed before the increasing the live traffic routed to the candidate instance for the first period of time.

15. The non-transitory machine-readable medium of claim 14, wherein the determining the reference cluster of instances of the application in the application pool comprises:

removing instance outliers in the application; and selecting a plurality of instances remaining after the instance outliers in the application are removed.

16. The non-transitory machine-readable medium of claim 15, wherein the operations further comprise:

identifying the candidate instance in the reference cluster of instances.

17. The non-transitory machine-readable medium of claim 15, wherein the operations further comprise determining the instance outliers using at least a density-based spatial clustering algorithm.

18. The non-transitory machine-readable medium of claim 14, wherein the increasing the live traffic routed to the candidate instance for the first period of time and the second period of time is performed in incremental steps.

19. The non-transitory machine-readable medium of claim 14, wherein the increasing the live traffic routed to the candidate instance for the first period of time and the second period of time includes increasing a weight of a traffic load being diverted to the candidate instance.

20. The system of claim 1, wherein:

the monitoring the candidate instance for the first period of time and for the second period of time comprises monitoring a central processing (CPU) usage of the candidate instance; and the determining that the increase in the live traffic routed to the candidate instance for the second period of time fails to result in the outlier metric comprises comparing the CPU usage of the candidate instance to CPU usage of each of the reference cluster of instances.

* * * * *